United States Patent
Gur et al.

(10) Patent No.: US 10,635,269 B2
(45) Date of Patent: Apr. 28, 2020

(54) SMART TABLES

(71) Applicant: Apple Inc., Cupertino, CA (US)

(72) Inventors: Yaniv Gur, Pittsburgh, PA (US); Roger Rock Rosner, Mountain View, CA (US); Jay Christopher Capela, Santa Cruz, CA (US); Christopher Douglas Weeldreyer, San Carlos, CA (US); Alan Eyzaguirre, San Francisco, CA (US); Matthew Ross Lehrian, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 15/220,093

(22) Filed: Jul. 26, 2016

(65) Prior Publication Data
US 2016/0334954 A1    Nov. 17, 2016

Related U.S. Application Data

(63) Continuation of application No. 11/647,936, filed on Dec. 28, 2006, now abandoned.

(51) Int. Cl.
| | | |
|---|---|---|
| *G06F 17/00* | (2019.01) | |
| *G06F 3/0483* | (2013.01) | |
| *G06F 17/24* | (2006.01) | |
| *G06F 3/0482* | (2013.01) | |
| *G06F 3/0484* | (2013.01) | |

(52) U.S. Cl.
CPC .......... *G06F 3/0483* (2013.01); *G06F 3/0482* (2013.01); *G06F 3/04847* (2013.01); *G06F 17/246* (2013.01)

(58) Field of Classification Search
CPC ..... G06F 17/246; G06F 3/0483; G06F 3/0482
USPC ......................... 715/217, 218, 212
See application file for complete search history.

(56) References Cited

U.S. PATENT DOCUMENTS

| | | | | |
|---|---|---|---|---|
| 5,721,847 | A * | 2/1998 | Johnson ................ | G06F 3/0481 715/209 |
| 5,890,174 | A * | 3/1999 | Khanna ................ | G06F 17/246 715/209 |
| 7,523,390 | B2 * | 4/2009 | Kotler .................. | G06F 17/211 715/212 |
| 2003/0195880 | A1 * | 10/2003 | Mancinelli .......... | G06F 16/2428 |
| 2006/0195780 | A1 * | 8/2006 | Zuccolotto ............ | G06F 17/246 715/273 |
| 2009/0037297 | A1 * | 2/2009 | Dixel ..................... | G06Q 10/10 705/26.8 |
| 2009/0083615 | A1 * | 3/2009 | Kotler .................. | G06F 17/211 715/219 |

(Continued)

*Primary Examiner* — Stephen S Hong
*Assistant Examiner* — Matthew J Ludwig
(74) *Attorney, Agent, or Firm* — Fletcher Yoder PC

(57) ABSTRACT

Features associated with smart tables are disclosed. In some embodiments, address tabs associated with a table are provided on-demand in response to receiving an indication of interest in the table. In some embodiments, controls for modifying the number of rows and/or columns of a table are provided on-demand when an indication of interest in the table is received. In some embodiments, in response to a passive indication of interest in an address tab associated with a row or column of a table, a set of one or more options associated with the row or column and/or associated table are made available.

26 Claims, 21 Drawing Sheets

(56) References Cited

U.S. PATENT DOCUMENTS

2014/0278864 A1* 9/2014 Stanislaw .......... G06Q 30/0246
                                                    705/14.16
2016/0334954 A1* 11/2016 Gur ....................... G06F 3/0483
2018/0027085 A1* 1/2018 Stanislaw ............... H04L 67/22
                                                    709/224

* cited by examiner

FIG. 1(c)

| | A | B | C | D | E | F | G |
|---|---|---|---|---|---|---|---|
| 1 | Name | Home Phone | Home Email | Number in Party | Invited | RSVP | Friends Of |
| 2 | Dana Baker | (650) 555-5489 | baker@mac.com | 1 | ☒ | ☐ | Mary |
| 3 | Susie Bartali | (408) 555-5848 | suebee@mac.com | 2 | ☒ | ☐ | Bill |
| 4 | Sue Brown | (408) 555-2589 | sbrown@mac.com | 2 | ☒ | ☐ | Both |
| 5 | Jason Capeja | (408) 555-5478 | jaymans@mac.com | 1 | ☐ | ☐ | Bill |
| 6 | Susan Cooper | (408) 555-9875 | coop@mac.com | 4 | ☒ | ☐ | Mary |
| 7 | Charlie Darwin | (650) 555-1287 | charlieds@mac.com | 1 | ☐ | ☐ | Bill |
| 8 | Eli Emory | (408) 555-7418 | ee2@mac.com | 1 | ☒ | ☐ | Both |
| 9 | Bob Franklin | (415) 555-3124 | frank@mac.com | 2 | ☒ | ☐ | Mary |
| 10 | Rick Gower | (408) 555-3568 | gower@mac.com | 1 | ☐ | ☐ | Mary |
| 11 | Betty Green | (408) 555-0021 | bgreen@mac.com | 1 | ☒ | ☐ | Both |
| 12 | Ron Howard | (310) 555-1025 | opie@mac.com | 2 | ☒ | ☐ | Bill |
| 13 | Rob Murtha | (650) 555-1403 | patriot2@mac.com | 4 | ☒ | ☐ | Bill |
| 14 | Alan Rickson | (650) 555-7931 | Alan25@mac.com | 1 | ☐ | ☐ | Bill |
| 15 | Barbera Roland | (408) 555-2580 | piano@mac.com | 2 | ☒ | ☐ | Mary |
| 16 | | | Total Invited: | 25 | | | |

| | A | B | C | D | E | F |
|---|---|---|---|---|---|---|
| | Name | Home Phone | Home Email | Number in Party | Invited | RSVP |
| | ▼ Friends of: Bill | | | | | |
| 2 | Susie Bartali | (408) 555-5848 | suebee@mac.com | 2 | ☑ | ☐ |
| 3 | Jason Capeja | (408) 555-5478 | jaymans@mac.com | 1 | ☐ | ☐ |
| 4 | Charlie Darwin | (650) 555-1287 | charlieds@mac.com | 1 | ☑ | ☐ |
| 5 | Eli Emory | (408) 555-7418 | ee2@mac.com | 1 | ☐ | ☐ |
| 6 | Rob Murtha | (650) 555-1403 | patriot2@mac.com | 4 | ☑ | ☐ |
| 7 | Alan Rickson | (650) 555-7931 | Alan25@mac.com | 1 | ☑ | ☐ |
| | ▶ Friends of: Both | | | | | |
| | ▼ Friends of: Mary | | | | | |
| 11 | Dana Baker | (650) 555-5489 | baker@mac.com | 1 | ☑ | ☐ |
| 12 | Susan Cooper | (408) 555-9875 | coop@mac.com | 4 | ☐ | ☐ |
| 13 | Rick Gower | (415) 555-3568 | gower@mac.com | 1 | ☑ | ☐ |
| 14 | Betty Green | (408) 555-0021 | bgreen@mac.com | 1 | ☐ | ☐ |
| 15 | Barbara Roland | (408) 555-2580 | piano@mac.com | 2 | ☑ | ☐ |
| 16 | | | Total Invited: | 25 | | |

FIG. 1(m)

SMART TABLES

CROSS-REFERENCE TO RELATED APPLICATION

This application claims benefit, under 35 U.S.C. § 120, as a continuation of U.S. application Ser. No. 11/647,936, filed Dec. 28, 2006, entitled "Smart Tables," the contents of which is incorporated by reference in its entirety.

BACKGROUND OF THE INVENTION

The workspace of a sheet of a spreadsheet application typically comprises an infinite (or seemingly infinite) grid or table that includes an unlimited (or very large) number of rows and columns of cells. Such a workspace is typically framed by row and column address tabs. Each of the row and column address tabs is uniquely labeled so that any cell in the workspace can be uniquely identified as the intersection of a row and a column address tab. Each of the cells in the workspace of a spreadsheet application typically has associated with it standard spreadsheet functionalities, such as the ability to enter data, formulas, controls, etc., and may include references to values in other cells by identifying such cells at least in part by the row and column address indicated by corresponding address tabs. However, the address tabs may not always be needed, and at such times their presence may be a distraction and/or may obscure other content. Therefore, there is a need for a way to provide the utility of address tabs and/or associated functionality only as needed.

BRIEF DESCRIPTION OF THE DRAWINGS

Various embodiments of the invention are disclosed in the following detailed description and the accompanying drawings.

FIG. 1(c) illustrates an embodiment of displaying address tabs of a table in response to detecting a selection of a cell of the table.

FIG. 1(f) illustrates an embodiment of selecting a control to add an additional row to a table.

FIG. 1(i) illustrates an embodiment of the addition of a new row and column to a table.

FIG. 1(m) illustrates an embodiment of collapsing a grouping of a table.

DETAILED DESCRIPTION

Figure 1A:
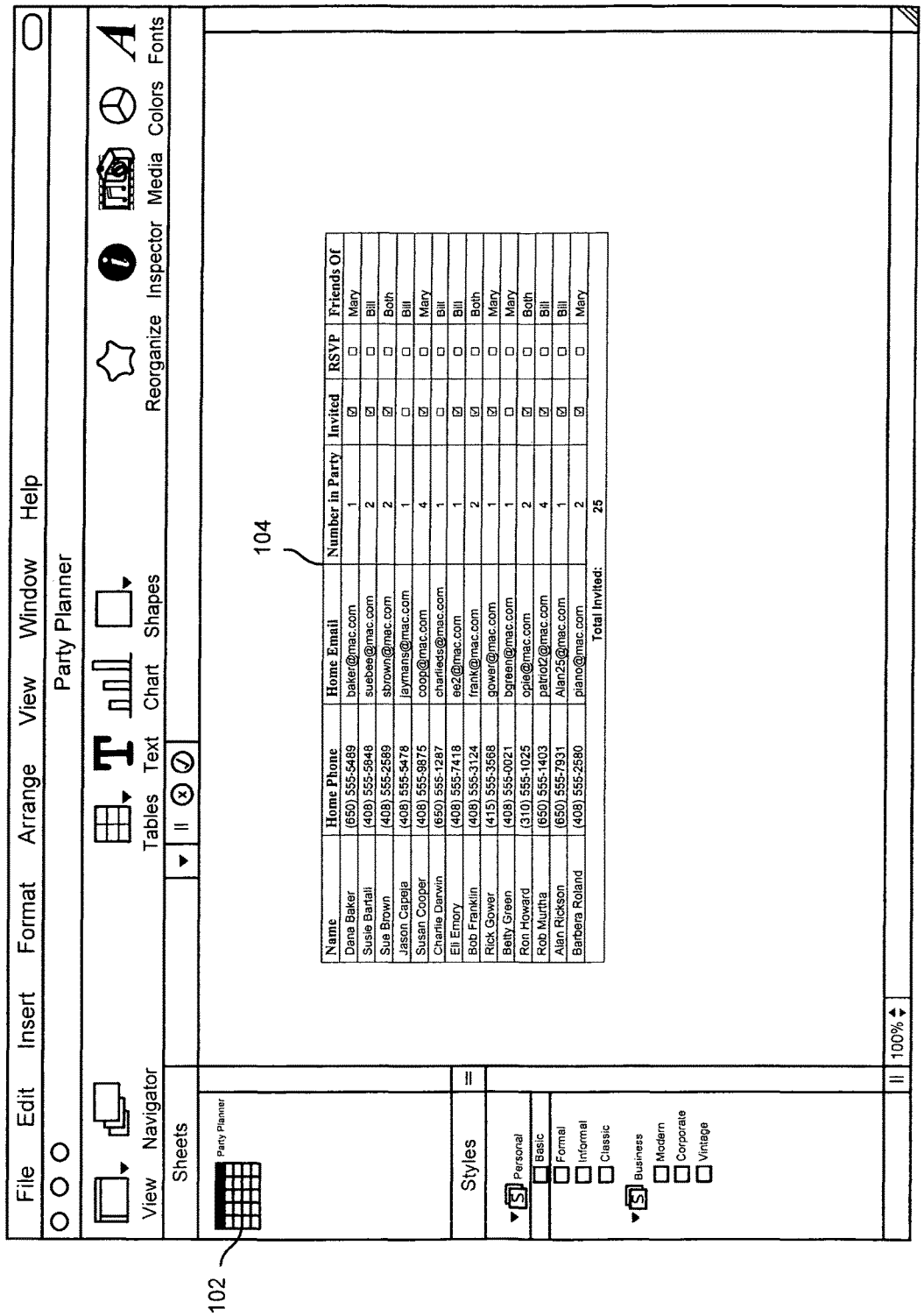
FIG. 1(a) illustrates an embodiment of displaying a table without its associated address tabs.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Features associated with smart tables are disclosed. In some embodiments, address tabs associated with a table are provided on-demand in response to receiving an indication of interest in the table. In some embodiments, controls for modifying the number of rows and/or columns of a table are provided on-demand when an indication of interest in the table is received. In some embodiments, in response to a passive indication of interest in an address tab associated with a row or column of a table, a set of one or more options associated with the row or column and/or associated table are made available.

Although many of the examples provided herein are with respect to tables in a spreadsheet application, the techniques described herein may be employed with respect to tables in any other appropriate application, spreadsheet or otherwise. The workspace of the spreadsheet application described in the examples herein comprises an infinite or seemingly infinite canvas on which one or more finite objects, such as tables, text, charts, graphs, shapes, images, photographs, graphics, animations, multimedia content, etc., may be placed. Depending on its type, an object may have at least standard spreadsheet functionality associated with it. For example, a table object is comprised of rows and columns of cells which are associated with at least standard spreadsheet functionality associated with cells. The term "at least standard spreadsheet functionality" in the context of cells of a table includes the ability to define the content of one cell in such a way that the content of the one cell is determined based at least in part on the content of one or more other cells, and the content of the one cell is updated automatically without further human action if the content of one or more of the one or more other cells is changed. With respect to a chart or graph, for example, the term "at least standard spreadsheet functionality" includes the ability to define a chart or graph based at least in part on the content of one or more cells and to update the chart or graph automatically and without further human action if the content of one or more of the one or more cells is changed.

Figure 1B:
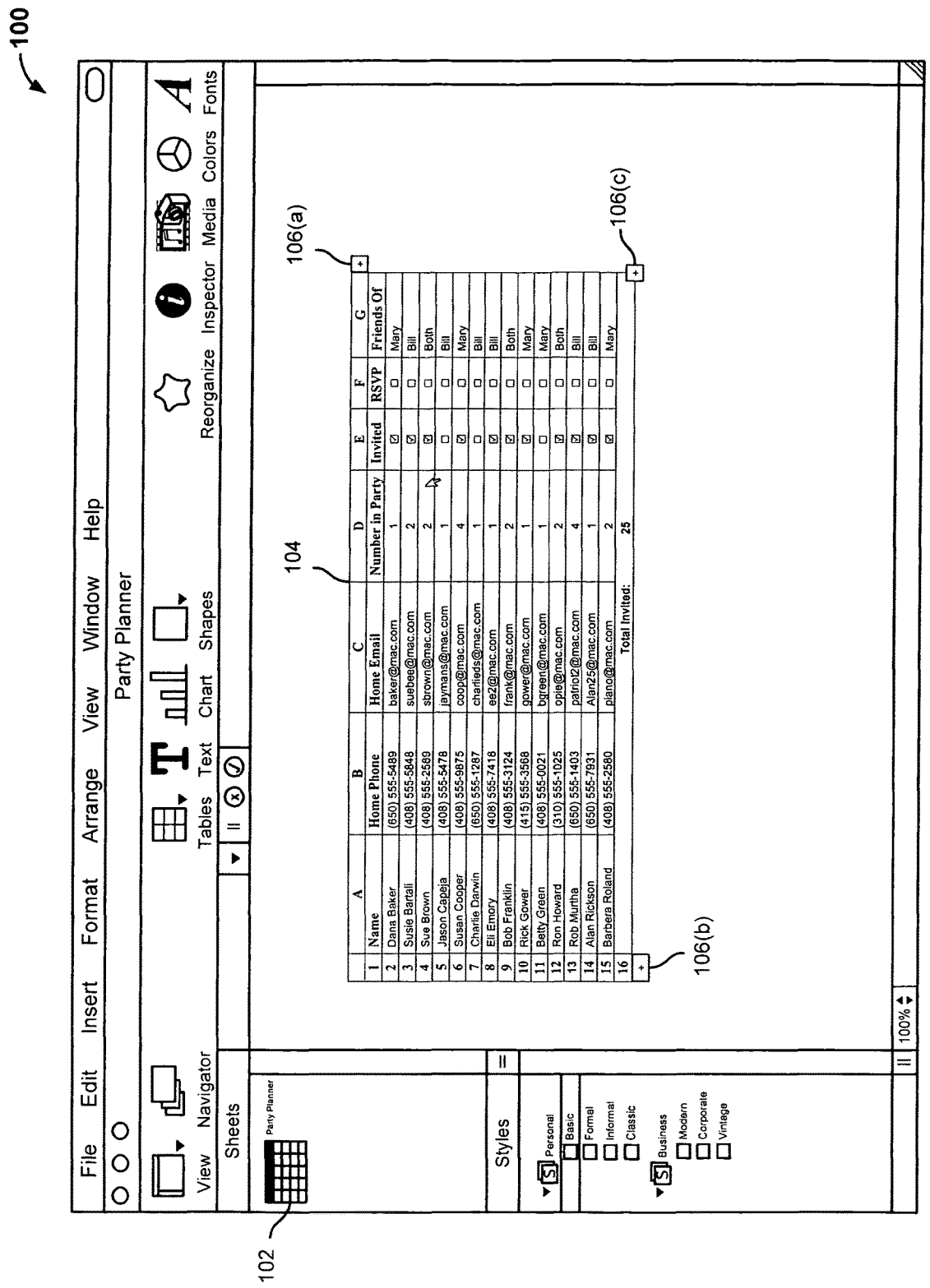
FIG. 1(b) illustrates an embodiment of displaying address tabs of a table in response to detecting a mouse over of the table.
Figure 1C:
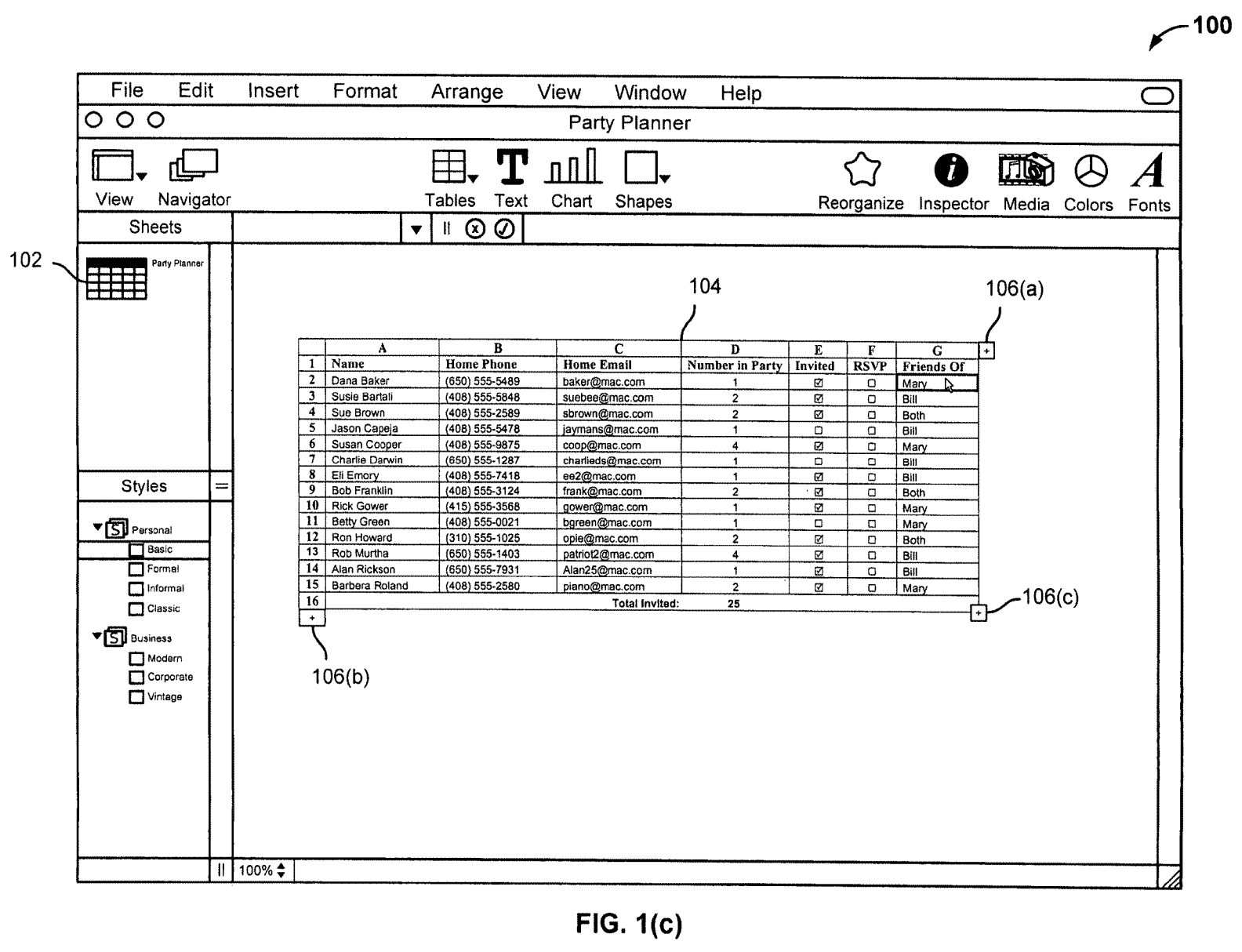
Figure 1D:
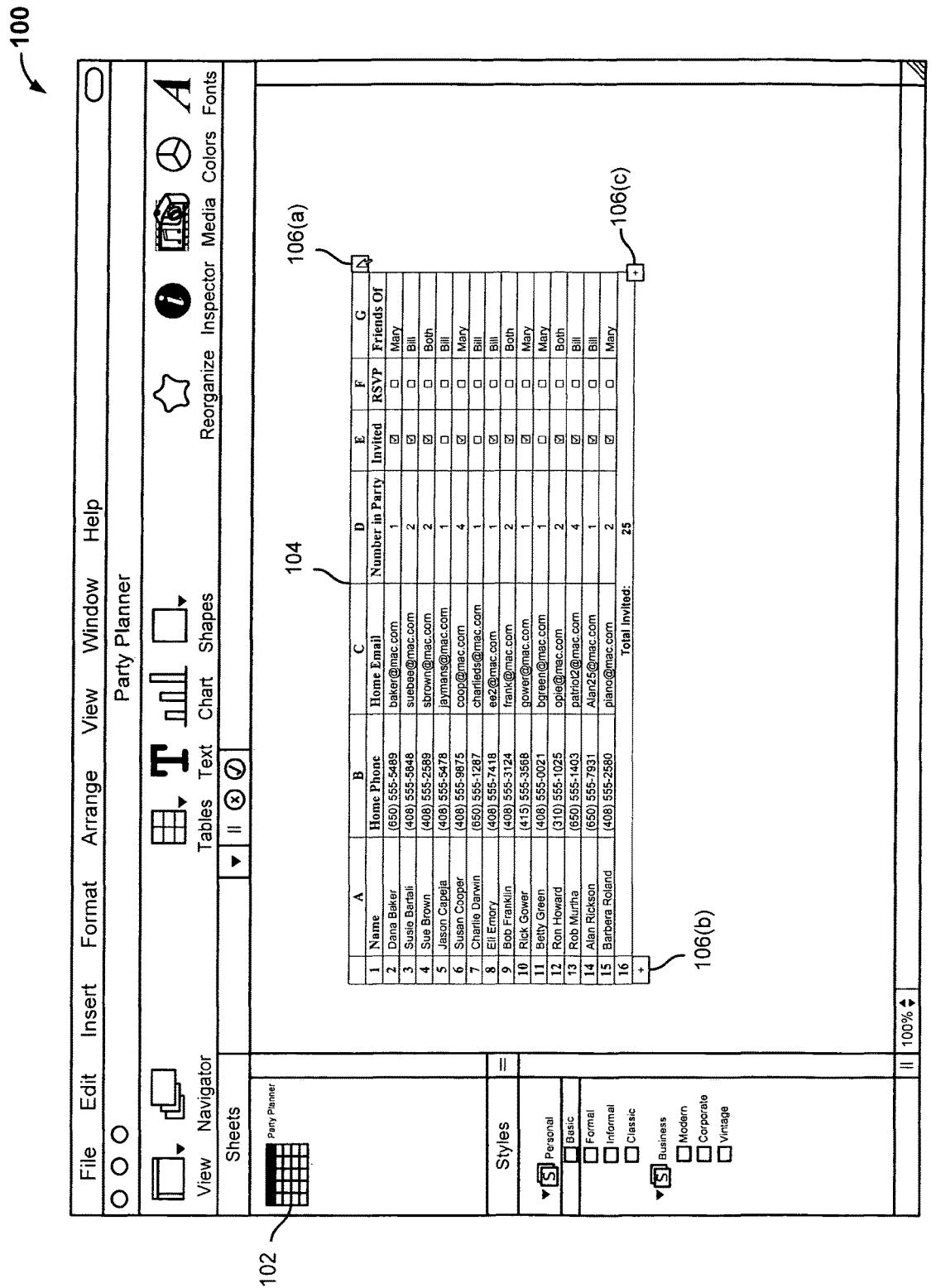
FIG. 1(d) illustrates an embodiment of selecting a control to add an additional column to a table.
Figure 1E:
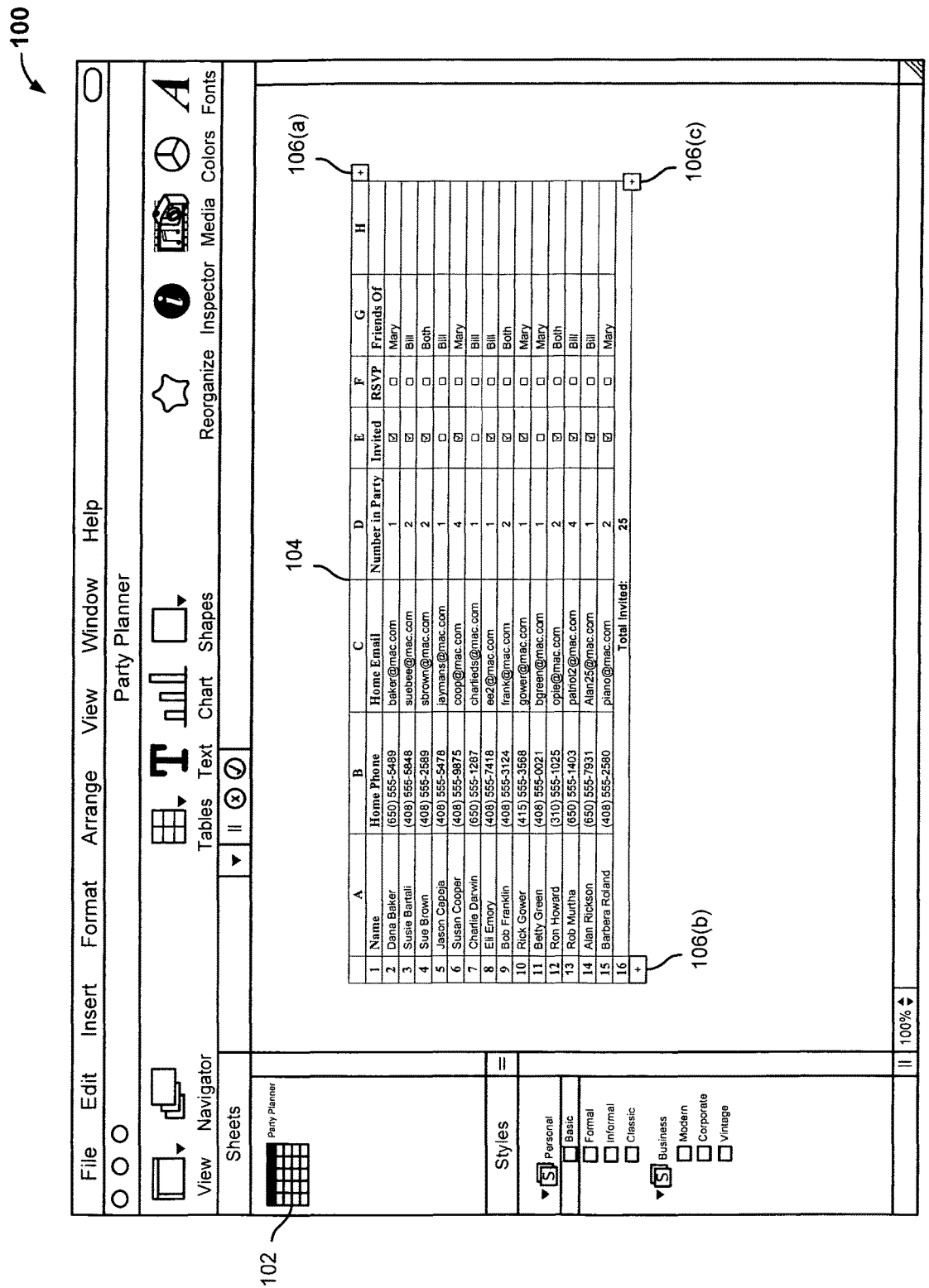
FIG. 1(e) illustrates an embodiment of the addition of a new column to a table.
Figure 1G:
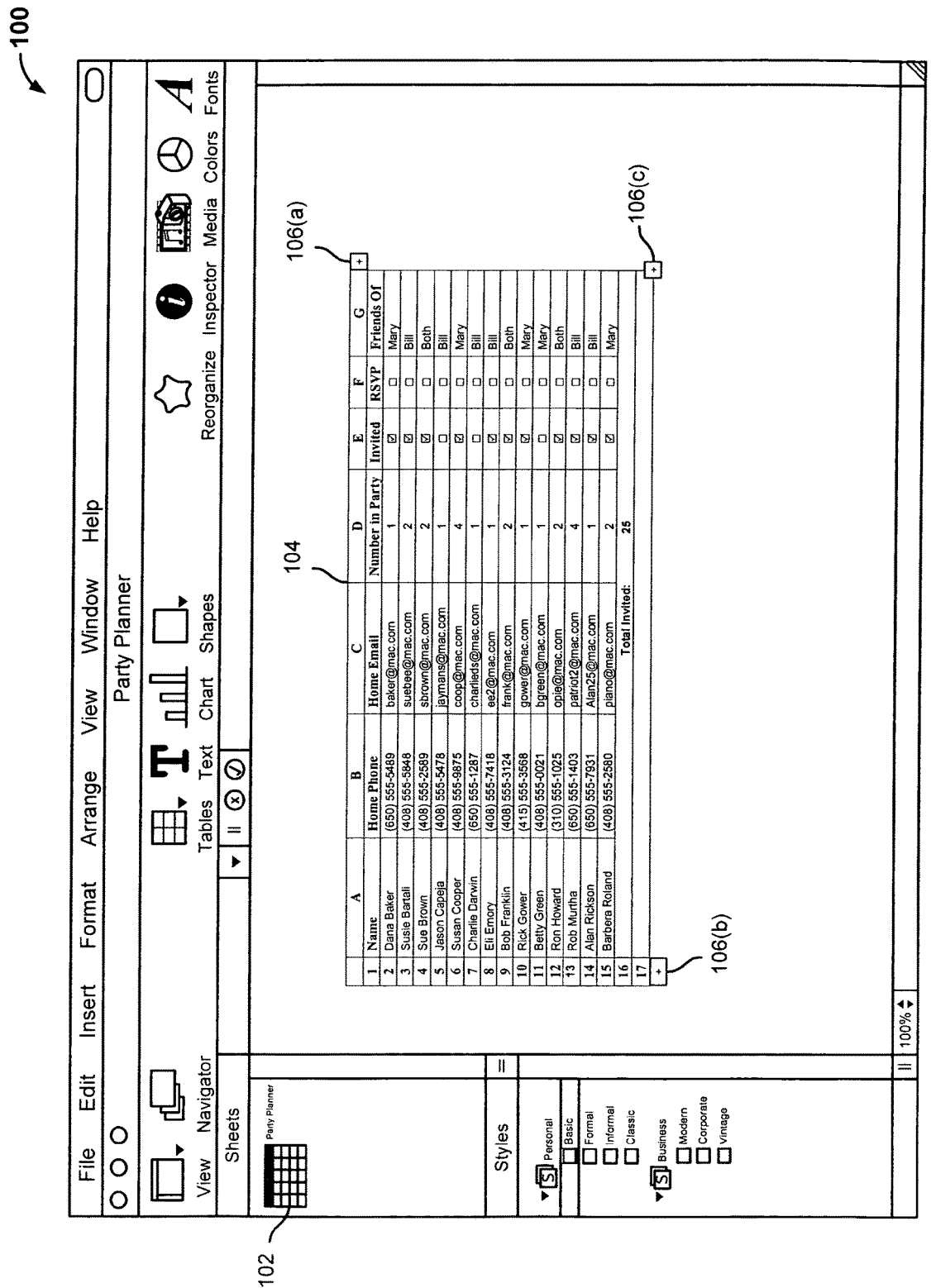
FIG. 1(g) illustrates an embodiment of the addition of a new row to a table.
Figure 1H:
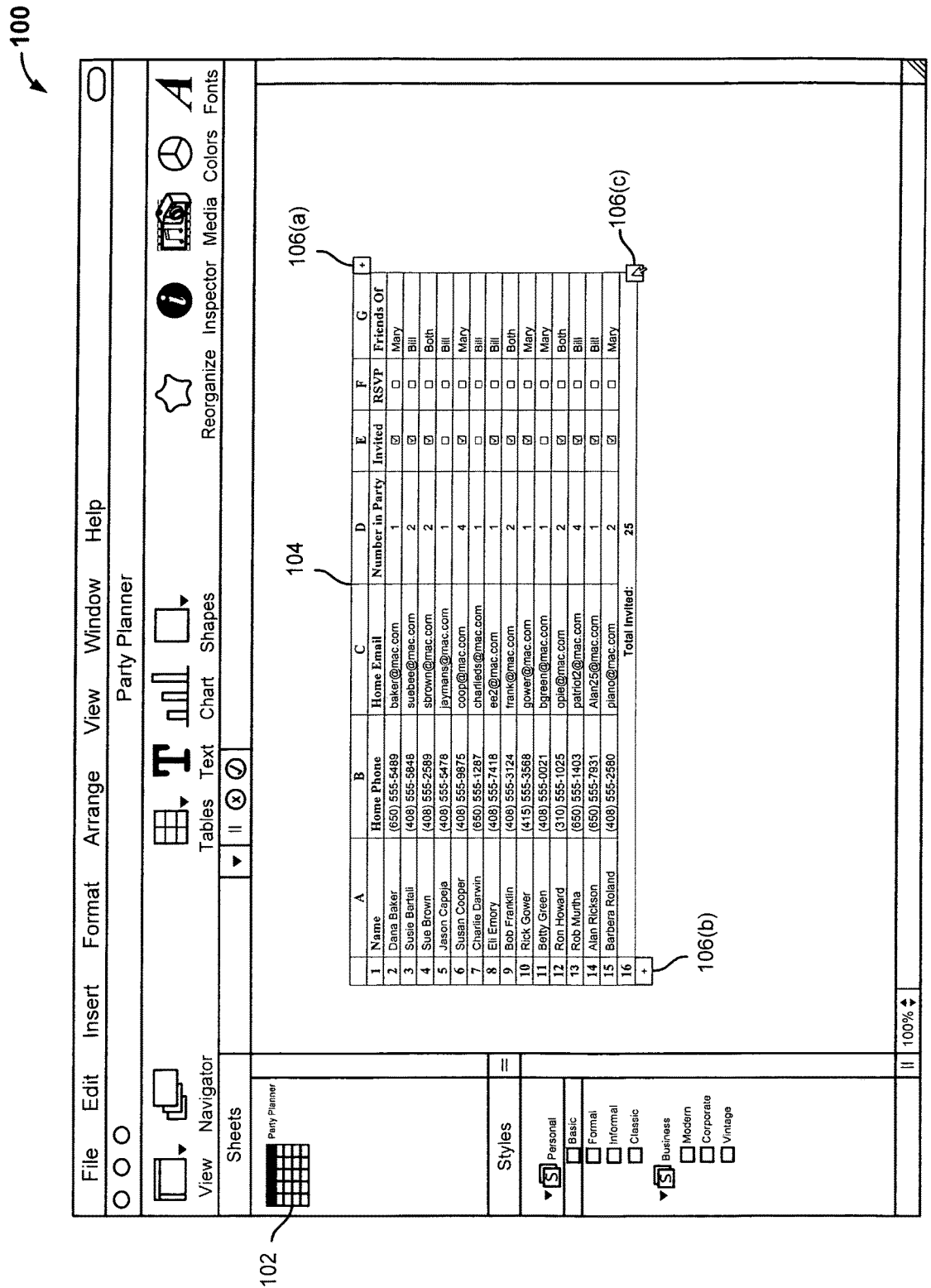
FIG. 1(h) illustrates an embodiment of selecting a control to add an additional row and column to a table.
Figure 1I:
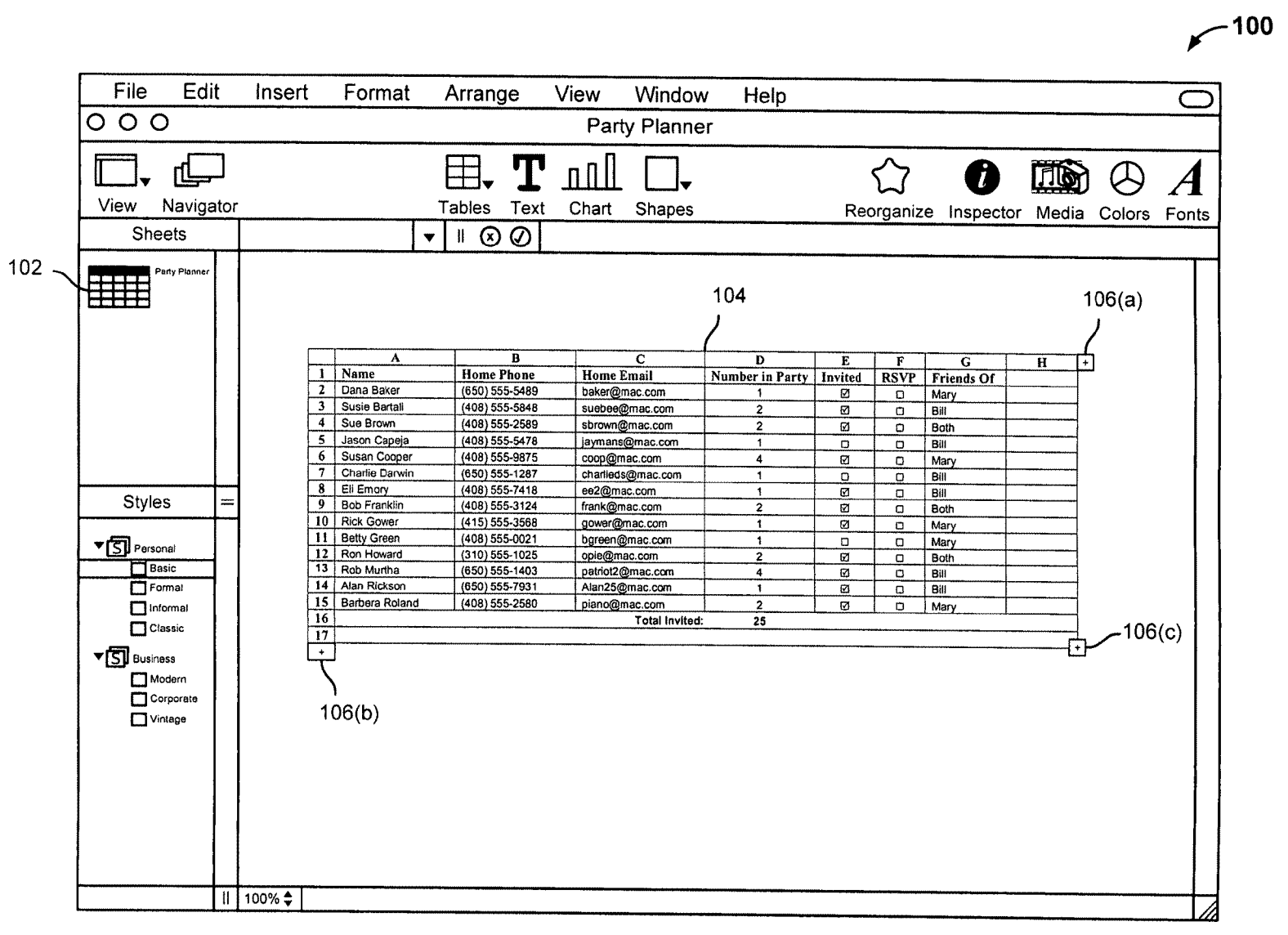
Figure 1J:
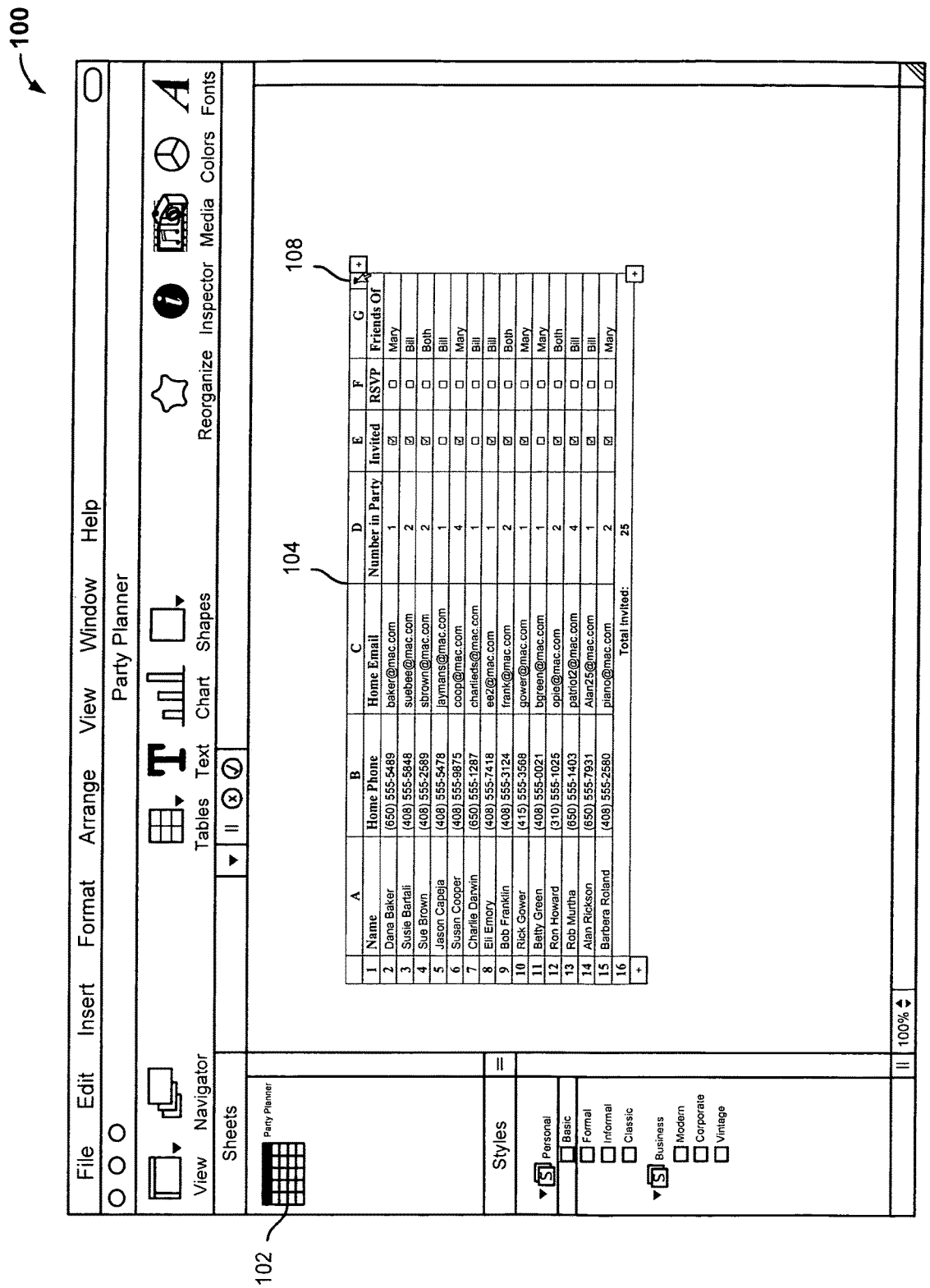
FIG. 1(j) illustrates an embodiment of a manner for accessing a menu of options from an address tab.
Figure 1K:
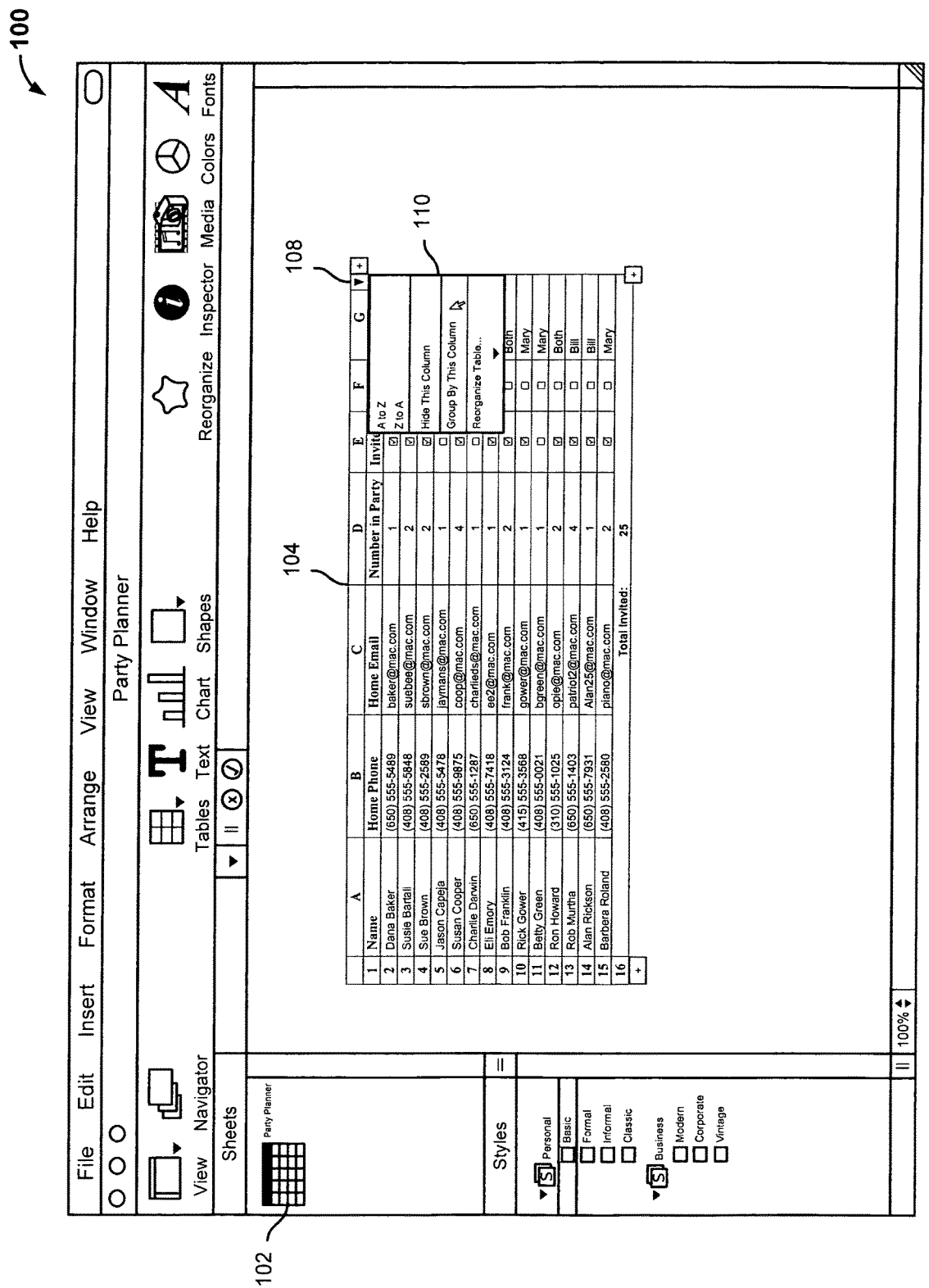
FIG. 1(k) illustrates an embodiment of selecting an option to group a table by the data included in a column.
Figure 1L:
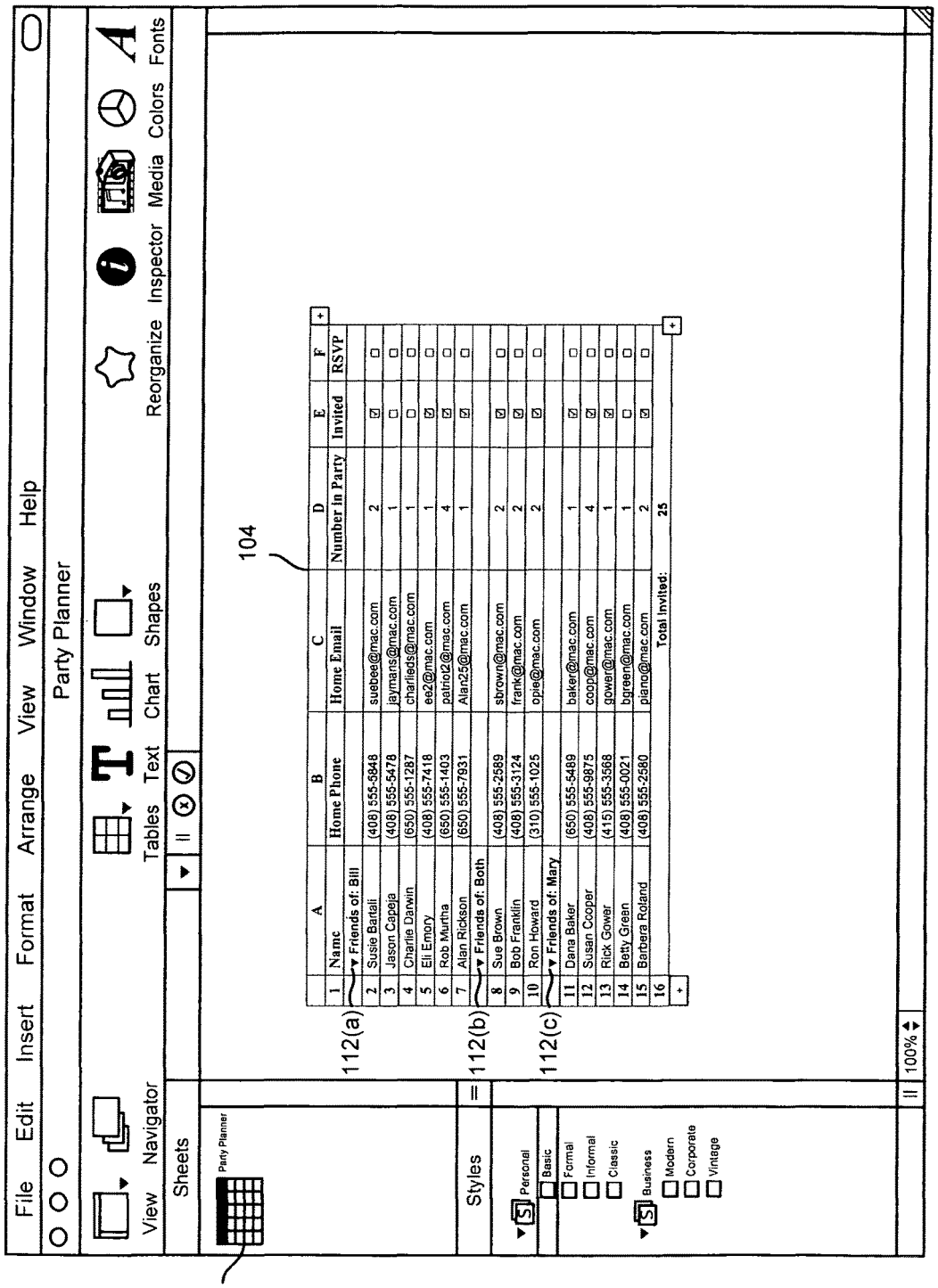
FIG. 1(l) illustrates an embodiment of grouping a table by the data included in a column.
Figure 1N:
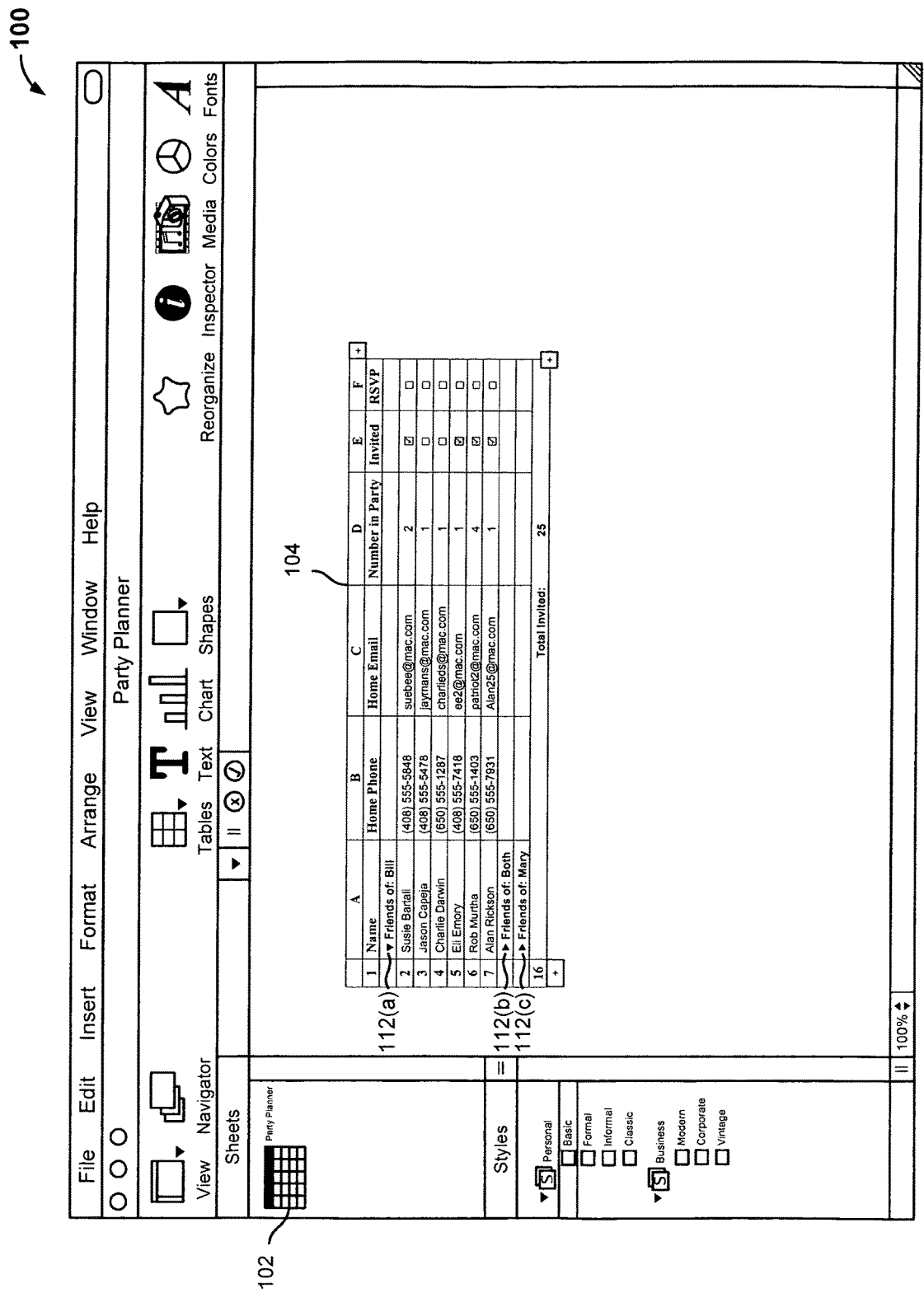
FIG. 1(n) illustrates an embodiment of collapsing a grouping of a table.
Figure 1O:
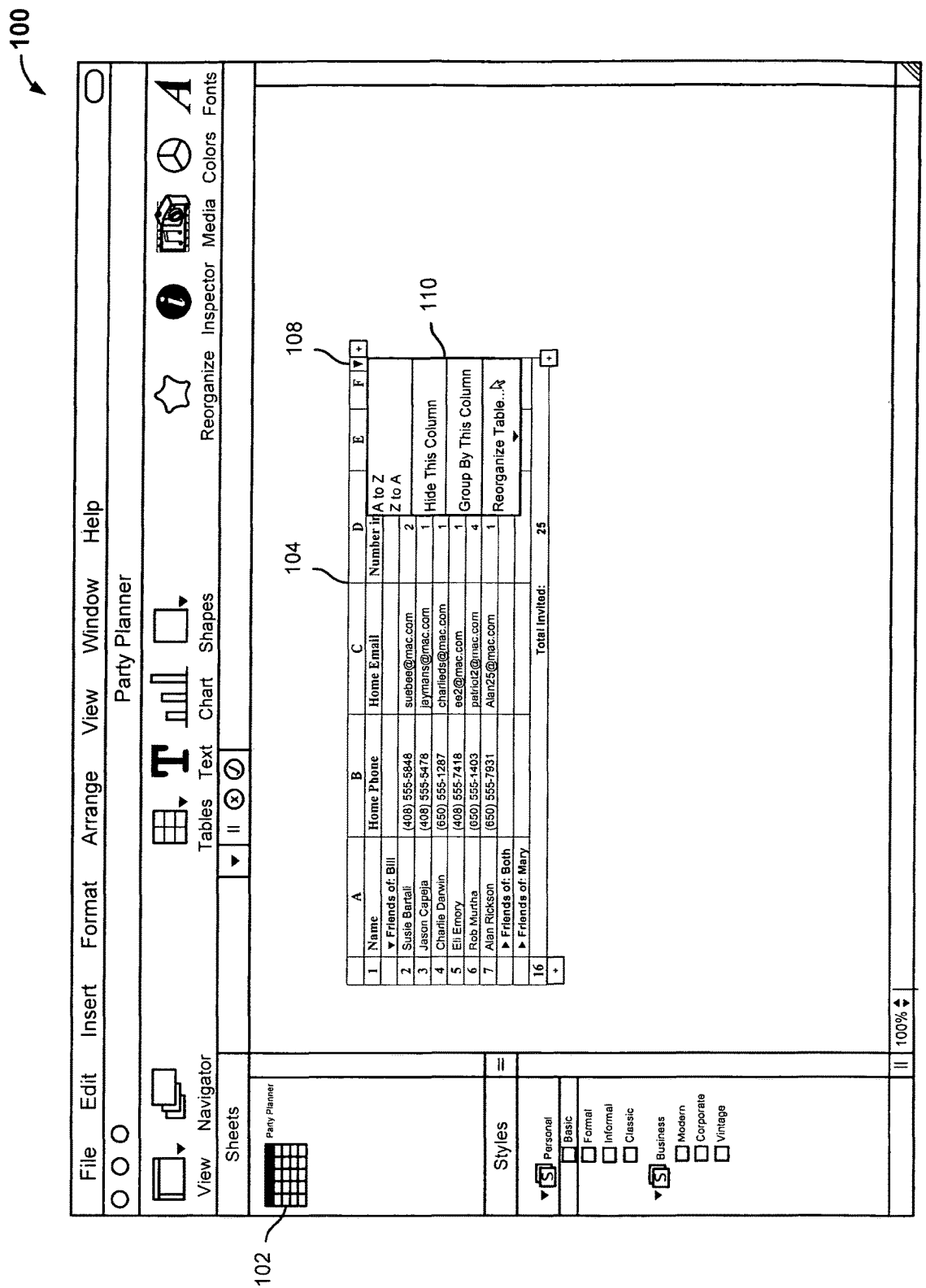
FIG. 1(o) illustrates an embodiment of selecting an option to reorganize a table.
Figure 1P:
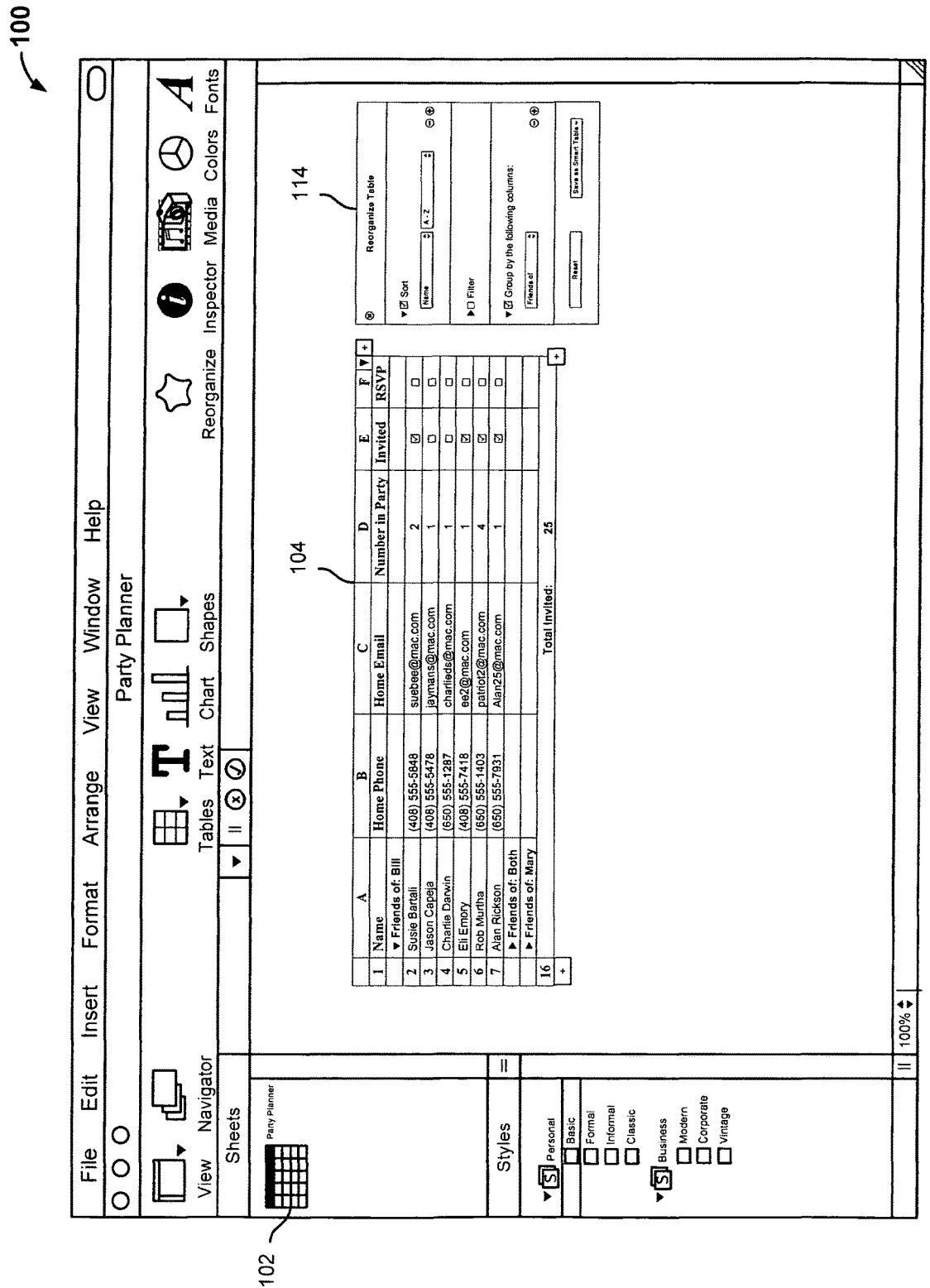
FIG. 1(p) illustrates an embodiment of an interface for reorganizing a table.
Figure 1Q:
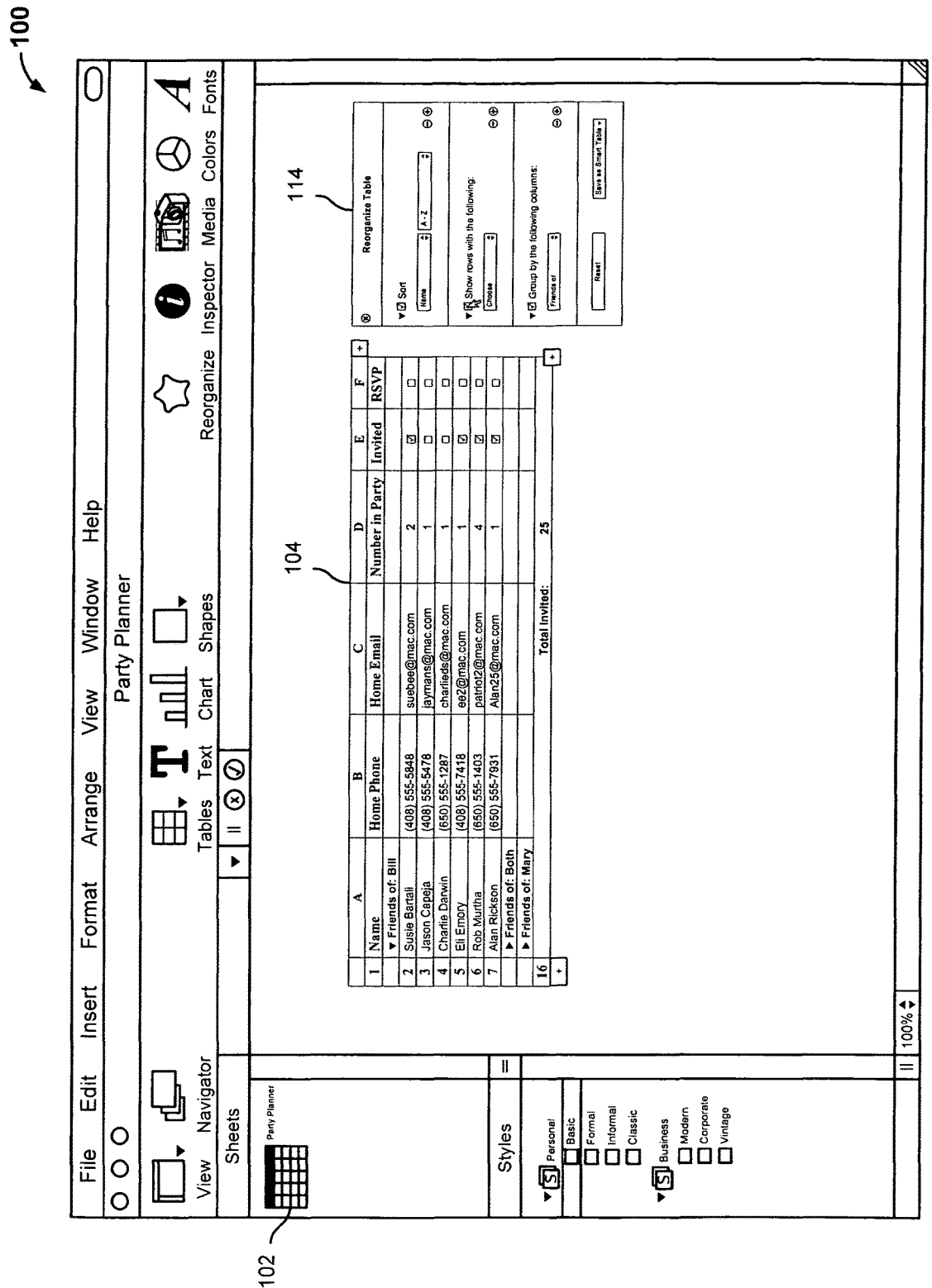
FIG. 1(q) illustrates an embodiment of selecting an option to apply a filter to the rows of a table.
Figure 1R:
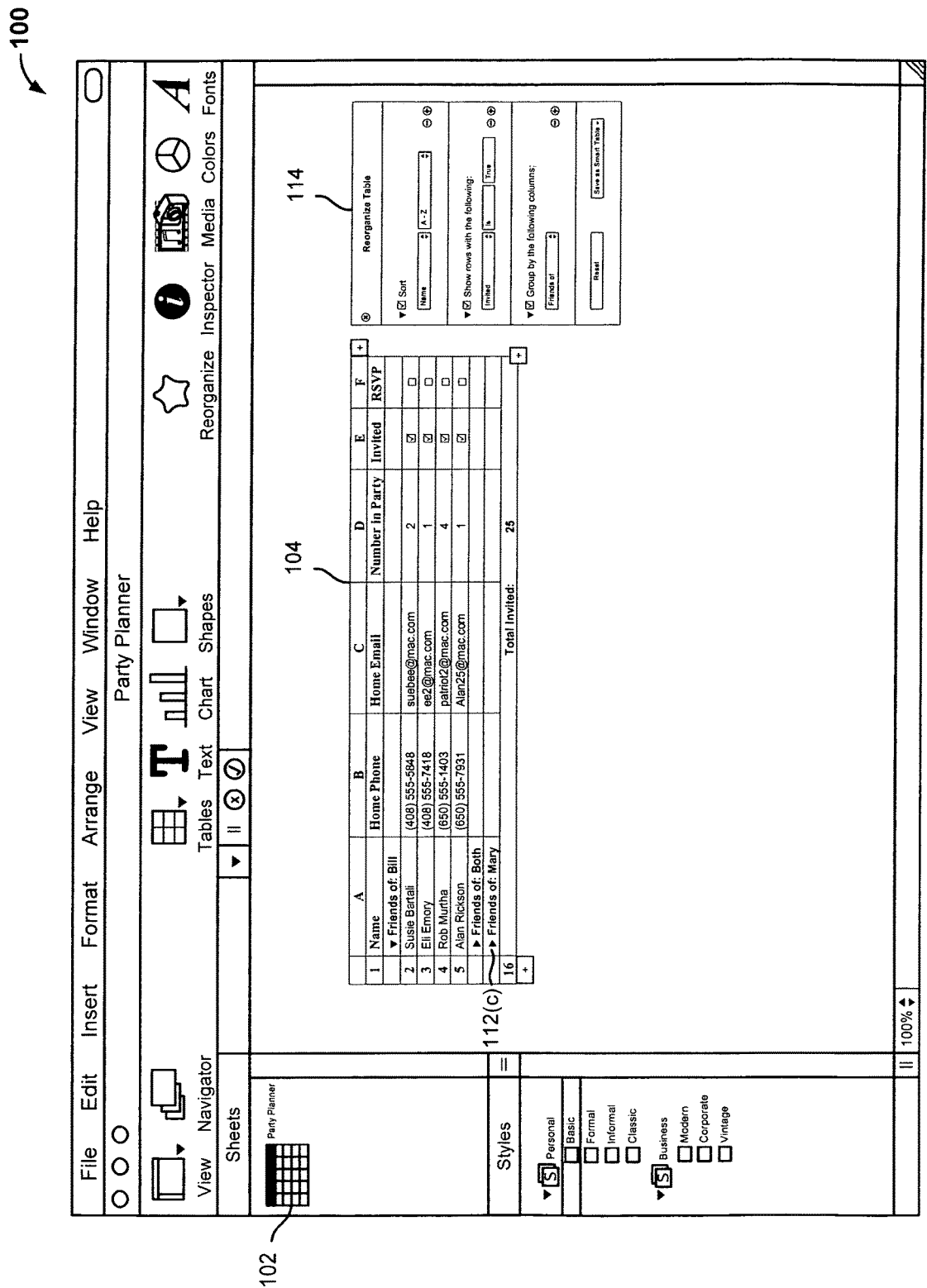
FIG. 1(r) illustrates an embodiment of a filtered version of a table.

FIGS. 1(a)-1(r) illustrate embodiments of various features and functionality associated with a "smart" table in a spreadsheet application. The user interface 100 associated with the spreadsheet application illustrated in FIGS. 1(a)-1(r) comprises various menus and options that include at least standard spreadsheet functionality. FIGS. 1(a)-1(r) specifically illustrate an embodiment of a sheet 102 in a spreadsheet application that includes a table 104. Sheet 102 is associated with planning a party and is named "Party Planner". Sheet 102 includes a table 104 associated with a guest list for the party. As depicted, the workspace of sheet 102 comprises an open canvas on which one or more finite objects, such as table 104, may be placed. Depending on its type, the spreadsheet functionality associated with the type of an object placed on the canvas, if any, is available to be used with respect to that object. For example, the cells of a table object, such as table 104, are associated with at least standard spreadsheet functionality associated with cells, including the ability to enter data, formulas, controls, etc., and the ability to include references to values in other cells of that table or another table or object on that sheet or on a different sheet. Each object included on the canvas is an independent object that can be formatted, moved around on the canvas, resized, scaled, etc., as a single object. Relationships and/or references may exist between one or more objects on one or more sheets such that, for example, modification of content included in one object may effect corresponding changes in one or more other objects that include references to the affected content.

The examples of FIGS. 1(a)-1(c) illustrate displaying address tabs associated with table 104 when an indication of interest in the table is received. In some embodiments, it is desirable to not always display the address tabs associated with a table since the address tabs are not a part of the table and create unnecessary noise on the canvas when they are not needed. In some embodiments, the address tabs associated with a table are initially displayed when a table is added to the canvas. The address tabs are displayed as long as an interest in a table and/or activity associated with the table exists but are hidden if no such interest and/or activity exists. In some such cases, the address tabs are only displayed in response to, for example, detecting a mouse over (or hovering over using any other appropriate input tool or technique) of a table, detecting a selection of a table and/or a cell of the table, detecting a modification of one or more properties and/or content of a table and/or one or more cells of the table, etc. Since the address tabs are used to uniquely identify cells of a table when including references to other cells in a formula, in some embodiments, the address tabs associated with a table are only displayed when an indication that a formula is being entered into a cell of the table is received, such as, for example, when an equal sign ("=") is entered into a cell of the table. In the example of FIG. 1(a), no address tabs are displayed with respect to table 104. In the example of FIG. 1(b), address tabs are displayed for table 104 in response to detecting a mouse over of table 104. In the example of FIG. 1(c), address tabs are displayed for table 104 in response to the selection of a cell (i.e. cell G2) of table 104. As depicted in the given examples, the address tabs associated with table 104 are provided on-demand as needed so as not to create unnecessary noise or distraction in the associated workspace when they are not needed.

In some embodiments, as illustrated in FIGS. 1(b) and 1(c), in addition to the address tabs, a set of controls 106(a)-(c) associated with adding rows and/or columns to table 104 is displayed when the address tabs are displayed. The functionality associated with controls 106(a)-(c) is illustrated in the examples of FIGS. 1(d)-1(i). The example of FIG. 1(d) illustrates selecting control 106(a) to add an additional column to table 104, and the example of FIG. 1(e) illustrates the consequent addition of a new column (i.e. column H) to table 104. The example of FIG. 1(f) illustrates selecting control 106(b) to add an additional row to table 104, and the example of FIG. 1(g) illustrates the consequent addition of a new row (i.e. row 17) to table 104. The example of FIG. 1(h) illustrates selecting control 106(c) to add both an additional row and column to table 104, and the example of FIG. 1(i) illustrates the consequent addition of a new row and column (i.e. row 17 and column H) to table 104. Although in the given examples, controls 106(a)-(c) are used to add a single row and/or column to a table, in others embodiments, controls 106(a)-(c) may be employed to simultaneously add a plurality of rows and/or columns to a table. In such cases, for example, when a control is selected, a user may be prompted via a user interface for the number of rows and/or columns to add and possibly the position in a given table at which to add the specified number of rows and/or columns. In some embodiments, instead of and/or in addition to providing the option to add rows and/or columns to a table, controls 106(a)-(c) may be analogously used to delete rows and/or columns from the table. Although in the given examples, controls associated with adding rows and/or columns to a table are provided when the address tabs associated with the table are provided, in alternative embodiments, the provisioning of such controls is not related to the provisioning of address tabs. For example, in various embodiments, controls or options for adding rows and/or columns may be always provided with a table, may be globally available via user interface 100 instead of or in addition to being available with respect to an individual table as depicted in the given examples, may be globally available via the "Insert" menu of user interface 100, may be available via a menu accessible from an address tab or a row or column header cell, etc.

In some embodiments, a set of one or more smart options or operations that can be applied to a corresponding row or column and/or an associated table may be made available via an address tab. Such a set of options includes, for example, options for sorting, formatting, hiding, unhiding, inserting, deleting, grouping, reorganizing, filtering, etc. In some embodiments, such options are automatically made available in response to one or more indications of interest in an address tab, such as when an address tab is moused over (or hovered over using any other appropriate input tool or technique), selected, clicked on, etc. The example of FIG.

1(*j*) illustrates an embodiment of a manner for accessing a menu of options from an address tab. As depicted in the given example, mousing over the column G address tab results in a control 108 to be displayed which when selected expands into a drop down menu of options 110 associated with column G as depicted in FIG. 1(*k*). Menu 110 includes options to sort (alphabetically from A to Z or from Z to A) the data included in column G, an option to hide column G from table 104, an option to group table 104 by the data included in column G, and an option to reorganize table 104. In various embodiments, any combination of one or more appropriate options may be provided via an address tab, and different options may be provided for different columns and rows depending on the content and/or relative context of a particular column or row in an associated table. For example, options to numerically sort in ascending or descending order rather than alphabetically sort from A to Z or Z to A may be provided for rows and/or columns that include numeric data. As depicted in the example of FIG. 1(*k*), the option to group table 104 by the data included in column G is selected, and FIG. 1(*l*) illustrates the result of grouping table 104 by column G. As depicted in FIG. 1(*l*), column G has been removed from table 104, and the rows of table 104 are grouped by the data of column G. That is, the guests included in table 104 are grouped by the "Friends of:" data from column G. As indicated by controls 112(*a*)-(*c*), the groupings of table 104 may be collapsed and expanded as desired. The example of FIG. 1(*m*) illustrates collapsing the "Friends of: Both" grouping of table 104 via control 112(*b*), and the example of FIG. 1(*n*) illustrates collapsing the "Friends of: Mary" grouping of table 104 via control 112(*c*).

The example of FIG. 1(*o*) illustrates selecting via the column F address tab an option to reorganize table 104. The selection of the "Reorganize Table" option in FIG. 1(*o*) results in a "Reorganize Table" user interface 114 to be provided as depicted in FIG. 1(*p*). In the given examples, the rows of table 104 are alphabetically sorted from A to Z by the "Name" column (i.e. column A), and from FIG. 1(*l*) onwards, the rows of table 104 are further grouped by the "Friends of" column (i.e. column G) of table 104. User interface 114 in FIG. 1(*p*) shows the existing sorting and grouping of table 104 and provides options for removing and/or modifying the existing sorting and/or grouping if desired. In addition, user interface 114 includes an option to filter the data included in table 104. The example of FIG. 1(*q*) illustrates selecting a filter to be applied to the rows of table 104, and as illustrated in FIG. 1(*r*), the filter is defined such that only the rows in which the "Invited" field is "true" (i.e. the rows in which the checkbox associated with the "Invited" field is checked) are shown in table 104. As illustrated in FIG. 1(*r*), the rows of table 104 associated with guests that have not been yet invited (i.e. guests Jason Capeja and Charlie Darwin in the "Friends of: Bill" group) have been filtered out. Similarly, if the "Friends of: Mary" group is expanded via control 112(*c*), the row associated with guest "Betty Green" would not appear in such a filtered version of table 104.

As depicted in the examples of FIGS. 1(*j*)-1(*r*), various smart options may be made available via an address tab of a table as applicable and depending on the content and/or context of an associated row or column with respect to the table. In some embodiments, such options are made available on-demand, for example, when an indication of interest in an associated address tab is received. Although the given examples depicted various options associated with columns, similar options may exist with respect to rows. The content included in a table may be manipulated and organized in various manners using such smart options. A table may be sorted, filtered, grouped, reorganized, etc., based on one or more rows and/or columns. In some embodiments, the set of options may include options to format cells; options to hide, delete, and/or insert one or more rows and/or columns; options to scale the associated table; options to format the associated table; etc. One or more options may be selected to be applied and/or reversed as desired. In some embodiments, instead of and/or in addition to options being made available via address tabs, options are made available via the header row and/or header column cells associated with a table, such as via the header cells in row 1 (i.e. "Name", "Home Phone", "Home Email", etc.) of table 104 in the given examples. Although providing smart options via control 108 and/or menu 110 have been described in the examples of FIGS. 1(*j*)-1(*r*), any other appropriate implementation and/or interface may be employed to provide a set of one or more smart options for an associated row and/or column.

Figure 2:
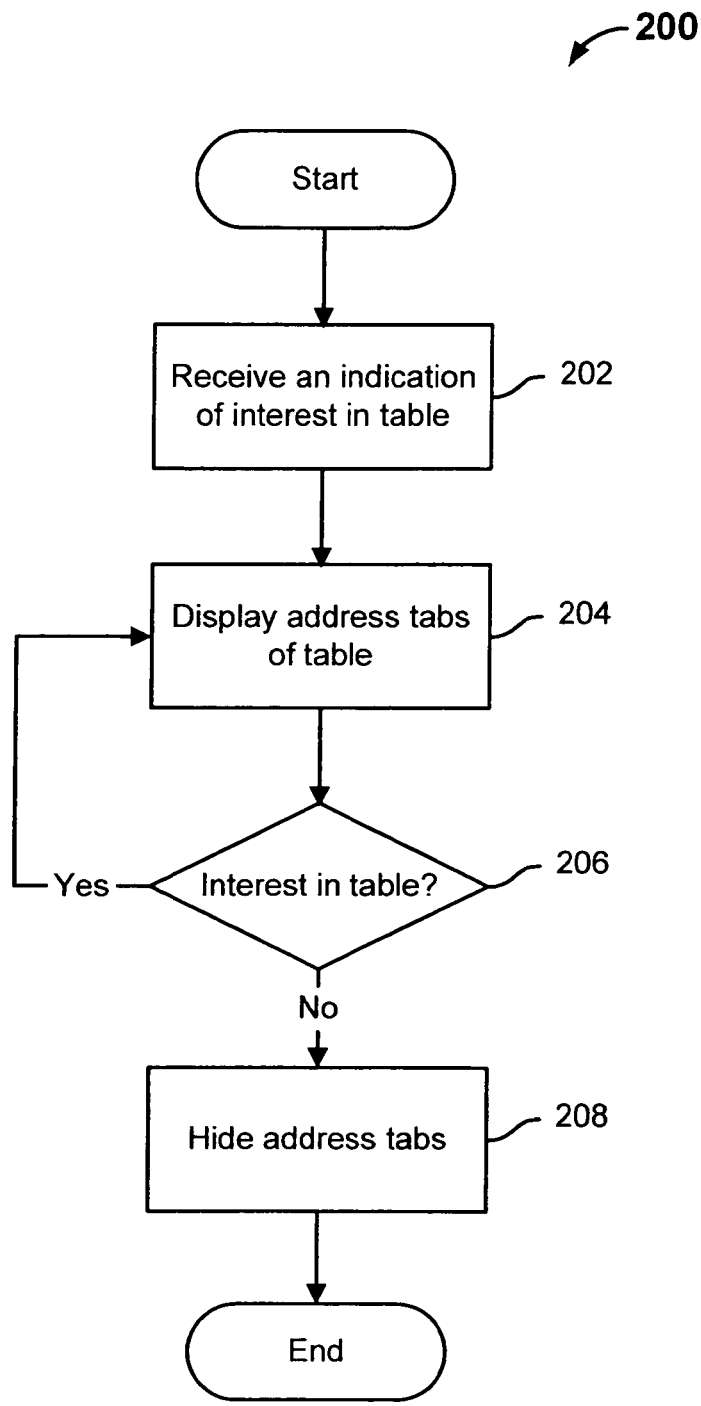
FIG. 2 illustrates an embodiment of a process for providing on-demand address tabs for a table.

FIG. 2 illustrates an embodiment of a process for providing on-demand address tabs for a table. In some embodiments, process 200 is employed to display the address tabs of table 104 in the examples of FIGS. 1(*b*)-1(*r*). Process 200 starts at 202 at which an indication of interest in a table is received. In various embodiments, such an indication of interest may be received when a new table is added to a workspace, from a mouse over or hovering over using any other appropriate input tool or technique of a table and/or from detecting any other passive interest in a table, from a selection of a table and/or one or more cells of the table, from a modification of one or more properties and/or content of a table and/or one or more cells of the table, from a formula being entered into a cell of a table, etc. At 204, address tabs are displayed for the table with respect to which the indication of interest was received at 202. In some embodiments, 204 optionally includes displaying controls for adding and/or deleting rows and/or columns to/from the table, such as controls 106(*a*)-(*c*) of FIGS. 1(*b*)-1(*i*). At 206 it is determined whether interest in the table still exists. If it is determined at 206 that interest in the table still exists, process 200 returns to 204 at which the address tabs are continued to be displayed. If it is determined at 206 that interest in the table no longer exists, for example, because the table and/or one or more associated cells are no longer being moused or hovered over, selected, modified, etc., the address tabs (and, in some embodiments, if optionally displayed at 204, the controls for adding and/or deleting rows and/or columns) are hidden at 208. Process 200 subsequently ends. With respect to FIG. 1(*a*), for example, the address tabs of table 104 are hidden when table 104 and/or its associated cells are not being moused over, selected, modified, etc., so that a cleaner view of the table, e.g., as the table would appear when printed, can be presented when the address tabs do not need to be displayed.

Figure 3:
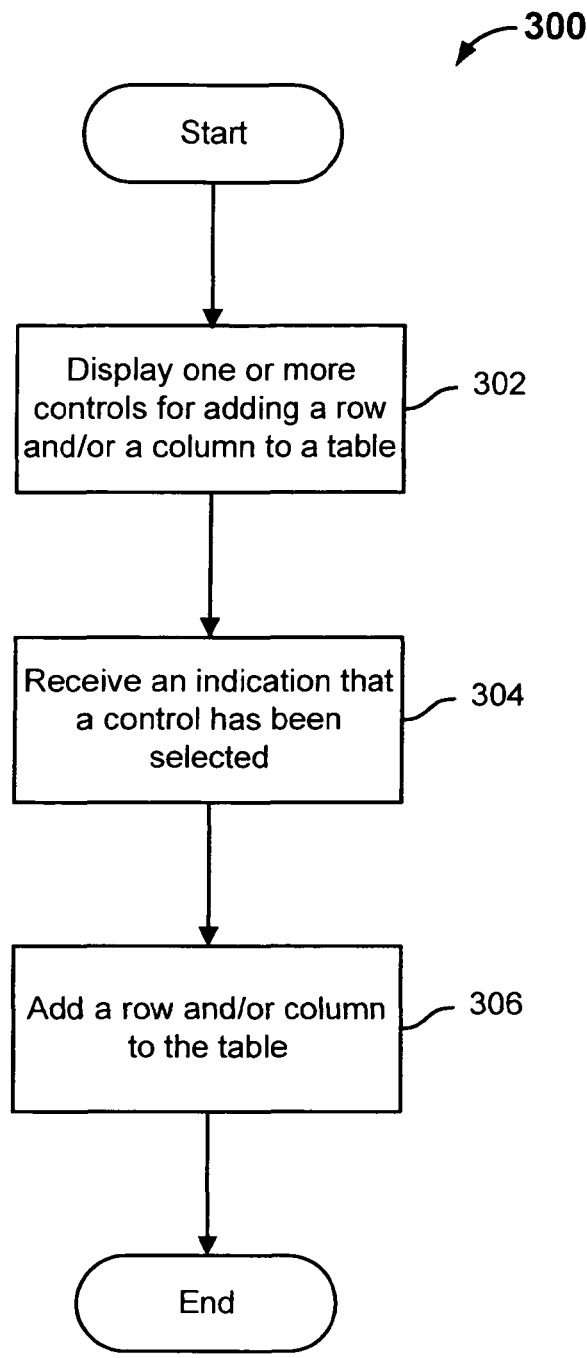
FIG. 3 illustrates an embodiment of a process for adding a row and/or a column to a table.

FIG. 3 illustrates an embodiment of a process for adding a row and/or a column to a table. In some embodiments, process 300 is employed with respect to the examples of FIGS. 1(*d*)-1(*i*) to add a new row and/or column to table 104. Process 300 starts at 302 at which one or more controls for adding a row and/or column to a table are displayed. For example, with respect to the examples of FIGS. 1(*b*)-1(*i*), 302 includes displaying controls 106(*a*)-(*c*) with respect to table 104. Alternatively, instead of being displayed with respect to a particular table object as illustrated in the examples of FIGS. 1(*b*)-1(*r*), the one or more controls of 302 may be made globally available to be used with respect to any table object. In some embodiments, the one or more controls of 302 include one or more of a control for adding a row to a table, a control for adding a column to a table, and a control for adding both a row and a column to a table. In some embodiments, the one or more controls of 302 are associated with simultaneously adding multiple rows and/or columns to a table. In some embodiments, the one or more controls are displayed with respect to a table at 302 when the address tabs of the table are displayed, for example, according to process 200 of FIG. 2. In some embodiments, the one or more controls are displayed with respect to a table at 302 when an indication of interest in the table, such as from the addition of the table as a new object in a workspace, from a mouse over or hovering over using any other appropriate input tool or technique of the table and/or from detecting any other passive interest in the table, from a selection of the table and/or one or more cells or address tabs of the table, from a modification of one or more properties and/or content of the table and/or one or more cells of the table, from a formula being entered into a cell of the table, etc., is received. In some embodiments, the one or more controls are displayed at 302 while such an indication of interest in the associated table is continued to be received and are hidden when no indication of interest in the associated table is received. At 304, an indication that a control for adding a row and/or a column has been selected is received. At 306, based on the control selected at 304, a row and/or column is added to an associated table. In some embodiments, 304 includes receiving an indication to add a plurality of rows and/or columns to an associated table, and 306 includes adding the specified number of rows and/or columns to the table. Process 300 subsequently ends. Although process 300 has been described with respect to adding rows and/or columns to a table, process 300 may be similarly employed to delete rows and/or columns from a table. In such cases, for example, controls for deleting rows and/or columns are provided at 302, and in response to receiving an indication that such a control has been selected at 304, the associated or specified rows and/or columns are deleted from a table. In some embodiments, controls for deleting rows and/or columns are provided instead of or in addition to controls for adding rows and/or columns.

Figure 4:
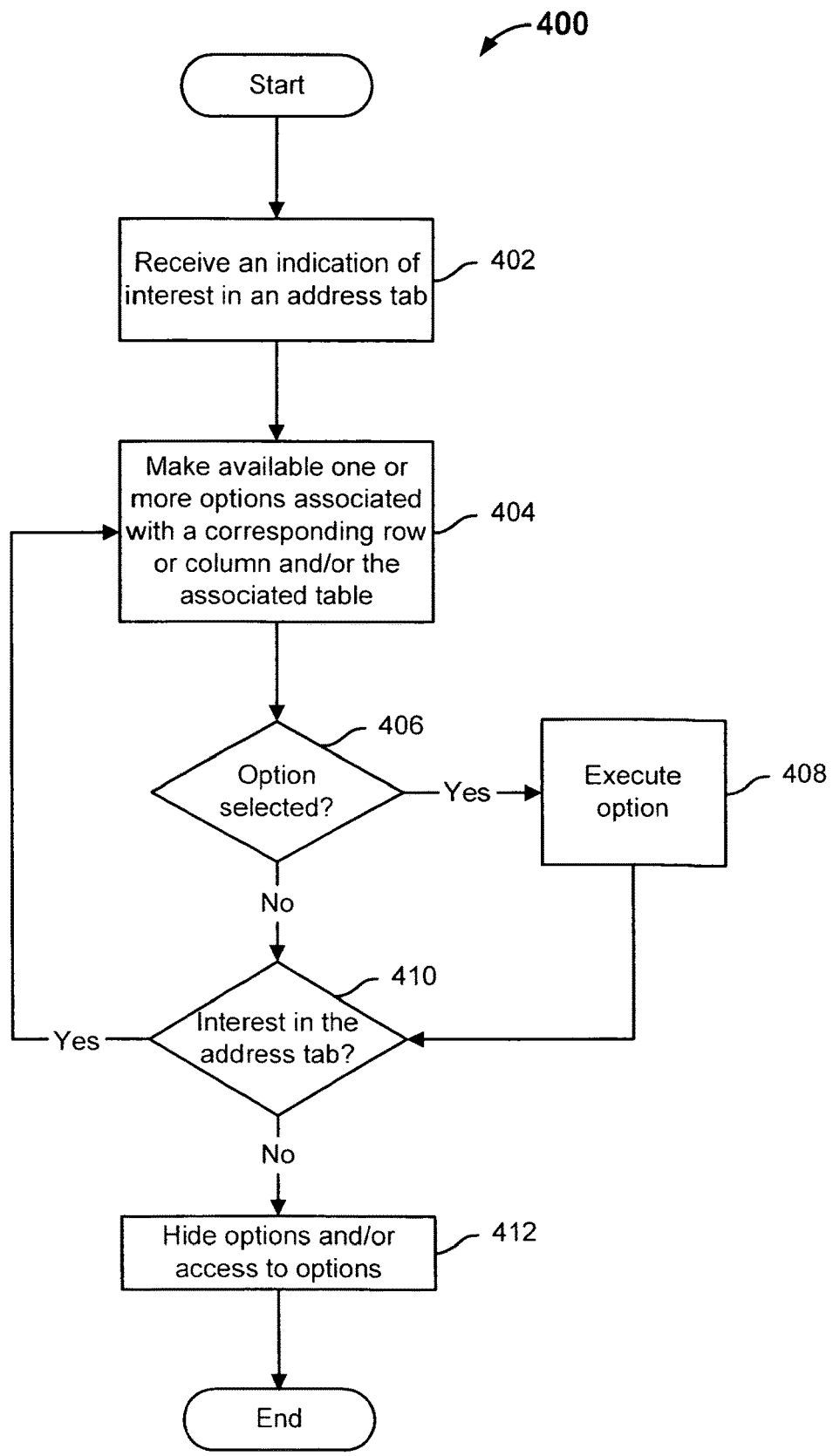
FIG. 4 illustrates an embodiment of a process for making available a set of one or more options via an address tab and executing a selected option.

FIG. 4 illustrates an embodiment of a process for making available a set of one or more options via an address tab and executing a selected option. In some embodiments, process 400 is employed with respect to the examples of FIGS. 1(j)-1(r). Process 400 starts at 402 at which an indication of interest in an address tab is received. For example, such as an indication of interest may be received in response to a mousing or hovering over and/or any other passive interest in, selection, clicking of, etc., an address tab. At 404, in response to the indication of interest received at 402, a set of one or more options associated with a corresponding row or column and/or an associated table are made available via the address tab. In some embodiments, the set of options are automatically made available at 404 in response to receiving one or more indications of interest in an address tab at 402 without requiring any deliberate action (e.g., a right click) from a user to access such options. In some embodiments, 404 includes displaying a control (e.g., control 108 of FIGS. 1(j), 1(k), and 1(o)) in an address tab which when selected expands into a drop down menu of the one or more options. In various embodiments, the set of options of 404 includes sorting (e.g., alphabetically or numerically) the data in an associated row or column, hiding an associated row or column from an associated table, deleting an associated row or column from an associated table, grouping an associated table by an associated row or column, reorganizing an associated table, filtering rows and/or columns of an associated table, formatting the cells of an associated row or column, inserting one or more new rows or columns in an associated table, scaling an associated table, formatting an associated table, etc. With respect to the given examples, 404 includes making available drop down menu 110 of FIGS. 1(k) and 1(o) via control 108. At 406, it is determined whether an option made available at 404 is selected. In some embodiments, if it is determined at 406 that an option is selected, a user interface associated with the selected option (such as user interface 114 of FIGS. 1(p)-1(r)) is made available to configure and/or further define the selected option. If it is determined at 406 that an option is selected, the associated option is executed with respect to a corresponding row or column and/or the associated table at 408. Upon executing a selected option at 408 or if it is determined at 406 that an option has not been selected, it is determined at 410 if an interest in the address tab of 402 still exists (e.g., it is determined if the address tab is still being moused or hovered over, is still in a selected state, is still clicked on, etc.). If it is determined at 410 that an interest in the address tab still exists, process 400 returns to 404 at which the one or more options are continued to be made available via the address tab. If it is determined at 410 that an interest in the address tab no longer exists, the options and/or access to the options (e.g., control 108 of FIGS. 1(j), 1(k), and 1(o)) are hidden at 412. Process 400 subsequently ends. Although process 400 has been described with respect to providing options via an address tab, process 400 may be similarly employed to provide options via a row or column header cell.

Various features and functionality of a "smart" table have been described herein. Address tabs of a table may be provided on-demand on an as needed basis so as not to create unnecessary noise and clutter in a workspace. Similarly, controls for modifying one or more dimensions of a table may be provided on an as needed basis. One or more context relevant smart options for manipulating and organizing data in a smart table may be made available via the address tabs and/or header cells of the table.

Although a spreadsheet application and user interface are described in the examples discussed in detail above, the techniques described herein may be employed with respect to any other application, spreadsheet or otherwise, and associated user interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method to provide address tabs and a control to a spreadsheet table comprising:

receiving a first indication of interest toward a spreadsheet table comprising at least one row and at least one column, wherein the first indication of interest is at least one of a selection of the spreadsheet table or a first mouse over operation of the spreadsheet table;

in response to receipt of the first indication of interest, displaying the address tabs, wherein each row and each column of the spreadsheet table comprises a respective address tab identifying the row or column while the address tabs are displayed receiving a second indication of interest toward a particular row or column of the spreadsheet table, wherein the second indication of interest comprises a second mouse over operation;

in response to receipt of the second indication of interest, displaying a control feature in an address tab associated with the particular row or column of the spreadsheet table, wherein the control feature comprises a button that, when selected, results in a menu of control features for the particular row or column;

receiving a third indication of interest away from the spreadsheet table; and in response to the receipt of the third indication of interest, hiding the address tabs and the control feature associated with the particular row or column of the spreadsheet table.

2. The method of claim 1, wherein the first indication of interest is the mouse over of the spreadsheet table and the third indication of interest is a mouse over away from the spreadsheet table.

3. The method of claim 1, wherein the first indication of interest is the selection of the spreadsheet table and the third indication of interest is a selection away from the spreadsheet table.

4. The method of claim 1, wherein the spreadsheet table comprises cells, and the second indication of interest is a selection of a cell of the cells.

5. The method of claim 1, wherein the first indication of interest is an indication that a formula is being entered in the spreadsheet table.

6. The method of claim 1, wherein a workspace comprises the spreadsheet table.

7. The method of claim 6, wherein a canvas comprises the workspace.

8. The method of claim 1, wherein the spreadsheet table comprises a finite object.

9. The method of claim 1, wherein a sheet of a spreadsheet application comprises the spreadsheet table.

10. The method of claim 1, wherein the spreadsheet table comprises cells, and each of at least a subset of the cells is associated with spreadsheet functionality.

11. The method of claim 10, wherein the spreadsheet functionality includes one or more of: an ability to enter data into a cell, an ability to enter a formula into a cell, an ability to enter a control into a cell, an ability to include in a cell a reference to another cell in the spreadsheet table, an ability to include in a cell a reference to another cell in another table, an ability to include in a cell a reference to another object, an ability to include in a cell a reference to another object in a sheet different from a sheet in which the spreadsheet table is included, and an ability to automatically update a value of a cell when a value associated with a reference included in the cell changes.

12. A system, including a computer processor, to provide address tabs and a control to modify one or more dimensions of a spreadsheet table, wherein the computer processor is configured to:

receiving a first indication of interest toward a spreadsheet table comprising at least one row and at least one column, wherein the first indication of interest is at least one of a selection of the spreadsheet table or a first mouse over operation of the spreadsheet table;

in response to receipt of the first indication of interest, display the address tabs, wherein each row and each column of the spreadsheet table comprises a respective address tab identifying the row or column while the address tabs are displayed, receive a second indication of interest toward a particular row or column of the spreadsheet table, wherein the second indication of interest comprises a second mouse over operation;

in response to receipt of the second indication of interest, display a control feature in an address tab associated with the particular row or column, wherein the control feature comprises a button that, when selected, results in a menu of control features for the particular row or column;

receive a third indication of interest away from the spreadsheet table; and in response to the receipt of the third indication of interest, hide the address tabs and the control feature associated with the particular row or column of the spreadsheet table.

13. The system of claim 12, wherein the computer processor is configured to provide an interface associated with the control feature, wherein the interface is configured to specify one or more dimensions of the spreadsheet table at one or more positions of the spreadsheet table.

14. The system of claim 12, wherein displaying the control feature includes globally providing the control feature via a spreadsheet interface.

15. The system of claim 12, wherein the menu of control features includes a control to add both one or more rows and one or more columns to the spreadsheet table.

16. A computer program product to provide a set of options, the computer program product being embodied in a non-transitory computer readable storage medium and comprising computer instructions for:

receiving a first indication of interest toward a spreadsheet table comprising at least one row and at least one column, wherein the first indication of interest is at least one of a selection of the spreadsheet table or a first mouse over operation of the table;

in response to receipt of the first indication of interest, displaying a plurality of address tabs, wherein each row and each column of the spreadsheet table comprises a respective address tab from the plurality of address tabs, identifying the row or column;

while the plurality of address tabs are displayed, receiving a second indication of interest of an address tab of the plurality of address tabs, wherein the second indication of interest comprises a second mouse over operation;

in response to receipt of the second indication of interest, displaying a control feature in the address tab, wherein the control feature is associated with a particular column or row of the spreadsheet, wherein the control feature comprises a button that, when selected provides the set of options, via a menu, to manipulate an organization of data included in the particular row or column identified by the address tab;

receiving a third indication of interest away from the address tab;

in response to receipt of the third indication of interest, hiding the provided set of options, via the menu;

receiving a fourth indication of interest away from the spreadsheet table; and in response to receipt of the fourth indication of interest, hiding the plurality of address tabs.

17. The computer program product of claim 16, wherein the third indication of interest away from the address tab is the same as the fourth indication of interest away from the spreadsheet table.

18. The computer program product of claim 16, wherein one or more options of the set of options are based at least in part on the data or type of data included in the row or column identified by the address tab.

19. The program computer product of claim 16, wherein one or more options of the set of options are based at least in part on context of the row or column identified by the address tab.

20. The computer program product of claim 16, wherein the set of options includes one or more of: sorting data in the row or column identified by the address tab, hiding the row or column identified by the address tab, unhiding the row or column identified by the address tab, deleting the row or column identified by the address tab, inserting one or more new rows or columns, formatting one or more cells included in the row or column identified by the address tab, grouping the spreadsheet table by the row or column identified by the address tab, reorganizing the spreadsheet table, filtering rows and columns comprising the spreadsheet table, scaling the spreadsheet table, and formatting the spreadsheet table.

21. The computer program product of claim 16, comprising an instruction for receiving a selection of an option from the set of options.

22. The computer program product of claim 21, comprising an instruction for providing an interface for configuring the selected option.

23. The computer program product of claim 21, comprising an instruction for executing the selected option.

24. The computer program product of claim 16, wherein the set of options includes an option to sort data in the row or column identified by the address tab.

25. The computer program product of claim 16, wherein the set of options includes an option to group the table by a row or column.

26. The computer program product of claim 16, wherein the set of options includes an option to filter a row or column.

* * * * *

UNITED STATES PATENT AND TRADEMARK OFFICE
CERTIFICATE OF CORRECTION

PATENT NO. : 10,635,269 B2
APPLICATION NO. : 15/220093
DATED : April 28, 2020
INVENTOR(S) : Yaniv Gur et al.

It is certified that error appears in the above-identified patent and that said Letters Patent is hereby corrected as shown below:

In the Claims

Column 9, Claim 12, Line 55, please replace the word "receiving" with --receive--.

Column 9, Claim 12, Line 63, please insert --;-- after the word "column".

Signed and Sealed this
Eighth Day of December, 2020

Andrei Iancu
*Director of the United States Patent and Trademark Office*